Nov. 3, 1931.  C. F. SMITH ET AL  1,830,340
BRAKE TESTING APPARATUS
Filed Aug. 15, 1928   4 Sheets-Sheet 4

Inventors:
Charles F. Smith
Walter F. Page
By MacLeod, Calver, Copeland & Dike
Attorneys.

Patented Nov. 3, 1931

1,830,340

UNITED STATES PATENT OFFICE

CHARLES F. SMITH, OF QUINCY, AND WALTER F. PAGE, OF BOSTON, MASSACHUSETTS, ASSIGNORS TO BRAKE SYNCHROMETER CO., OF BOSTON, MASSACHUSETTS, A CORPORATION OF MASSACHUSETTS

BRAKE TESTING APPARATUS

Application filed August 15, 1928. Serial No. 299,786.

This invention relates to an apparatus or machine for testing the efficiency of brakes in automotive vehicles, and for enabling the brakes to be accurately and properly synchronized, of the general type shown and described in United States Patents Nos. 1,746,718 and 1,756,666 to Charles F. Smith.

The present invention has for an object to provide an improved apparatus for carrying out the foregoing purposes.

In carrying out the present invention, the vehicle is run onto a suitable platform or elevated ways into operative position with respect to the apparatus, and each wheel of the vehicle is supported on a rotor which is adapted to be driven by and to turn with the vehicle wheel. Besides a drum which contacts with the vehicle wheel the rotor comprises a flywheel and a shaft upon which both the drum and flywheel are mounted. The flywheel is of relatively light weight and large diameter and, together with the drum, acquires a momentum by the measurement of which the braking action on each of the wheels may be tested. Adapted to be connected to and disconnected from each of the rotors is an indicating device, connected to the rotor shafts upon putting on the brakes, which visually indicates the extent of movement of each rotor and its co-acting wheel during the braking action thereon. In this way, the extent of movement from the commencement of the braking action until the vehicle wheels cease rotating is determined for each wheel.

It is important in order to make an accurate comparison of the brakes for all the wheels, that at the beginning of the test all the wheels of the vehicle be revolving at the same rate of speed and therefore driving all the rotors at the same speed. In the patents referred to above there is shown and described an apparatus in which there are mounted on the proximate ends of both front and rear pairs of shafts halves of a grooved pulley, the halves being spaced far enough apart so that there will be no frictional contact therebetween. The pulleys are connected and driven by means of an endless belt whereby the speed of both front and rear pairs of shafts may be synchronized. This arrangement is not altogether satisfactory since there is some slippage between the belt and pulley members preventing perfect synchronization of the rotors.

In the present embodiment of our invention the front and rear pairs of wheels respectively are synchronized by means of positive clutches as will be hereafter explained, and both of said clutches driven by worm gears from a worm shaft, whereby the speed of both clutches is synchronized. Thus at the commencement of the braking operation all of the wheels will be moving at exactly the same speed. When the braking operation is begun the synchronizing clutches are disengaged and the recording devices for the rotor shafts are actuated, so that the travel of each wheel will be independent of the other wheels and will be independently recorded.

Other features of the invention are set forth in the following description and appended claims, reference being had to the accompanying drawings forming a part of this specification wherein like reference characters designate corresponding parts in the several views and wherein:

Fig. 6 is a detail view showing a manner of locking the rack by which the apparatus may be adjusted for various lengths of wheel base.

Fig. 7 is a detail view of the treadle engaging mechanism for holding the clutches engaged preparatory to making a test.

Figure 1:
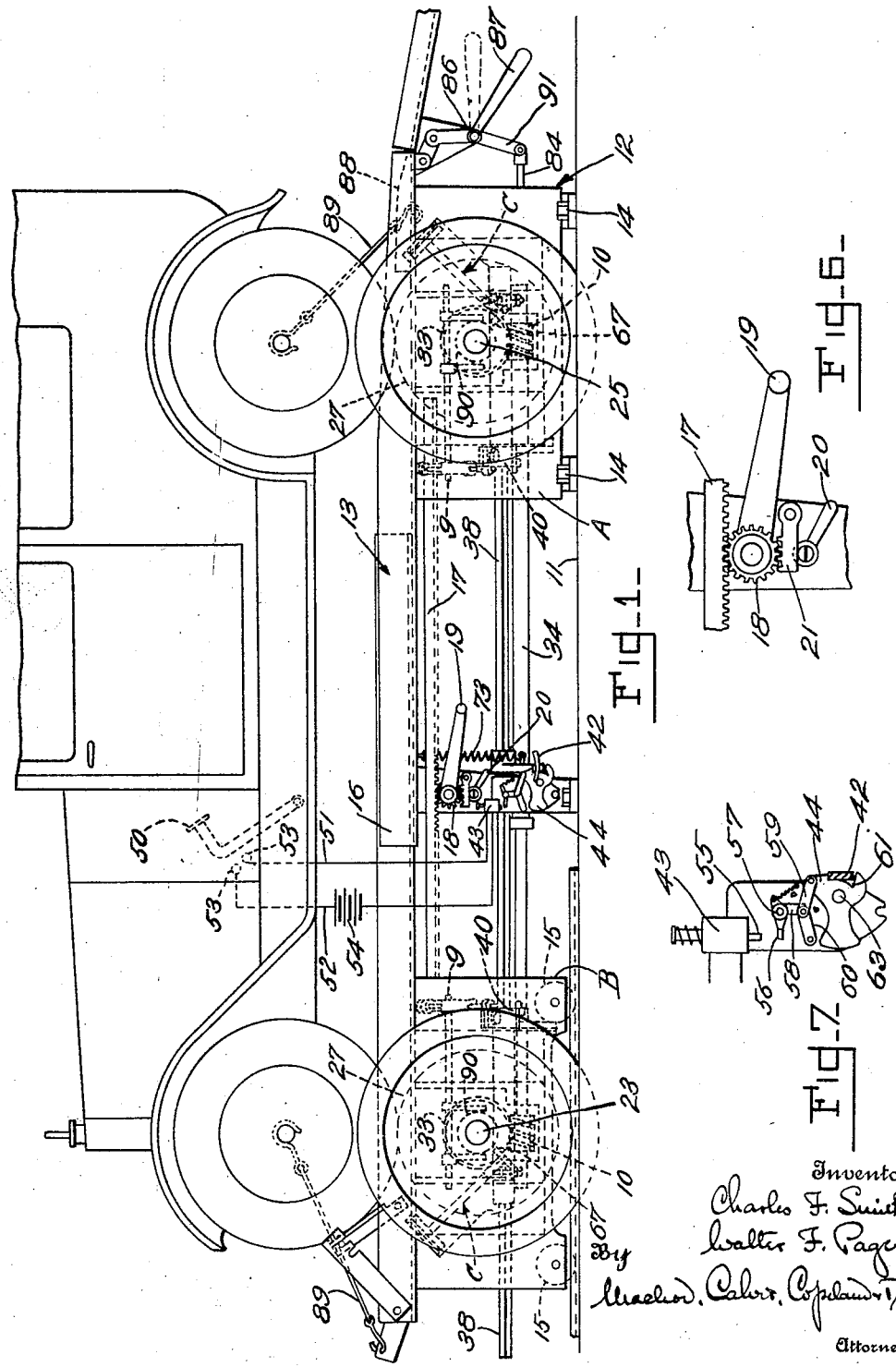
Fig. 1 is a side elevation illustrating an embodiment of our improved apparatus with a car in position on the ways in readiness for the start of the test.

It is to be understood that the invention disclosed herein is not limited to the details of construction and arrangement of parts which are illustrated in the accompanying drawings, since the invention is capable of other embodiments, and the phraseology which is employed is for the purpose of description and not of limitation.

In the drawings we have illustrated an improved and preferred form of device for testing vehicles having brakes on all wheels.

The apparatus comprises a base 11, upon which is supported a frame 12 carrying a pair of spaced ways 13. One end of the frame indicated at A is fixed to the base at 14, while the other end indicated at B is movably mounted on rollers 15. The ways 13 are partly telescoped as shown at 16 permitting the apparatus to be adjusted in length according to the wheel base of the car to be tested. In order to accomplish this adjustment racks 17 fixed to the movable portion B of the frame are provided along each side of the apparatus and are controlled by the pinions 18 mounted on the fixed portion of the frame. The pinions 18 are hand operated by means of the handle 19 and may be locked in place by movement of the lever 20 which raises the pinion lock 21 into engagement with the pinion.

Beneath the ways 13, at both the front and rear of the apparatus the frame 12 comprises the standards 22. Suitably mounted in these standards 22 are the rotors—comprising the drum 27, the flywheels 29 and the transverse shafts 23 and 24, 25 and 26 respectively, which terminate substantially midway between the opposite ways. The front shafts 23 and 24 and the rear shafts 25 and 26 respectively are in alinement but are spaced endwise from each other so that they are independently rotatable. The drums 27 which as set forth above are mounted on each shaft and project a suitable distance through the slots or openings 28 in the ways 13. The flywheels 29 are also mounted on each shaft, preferably on the outside of each rotor. The flywheels are so designed that at a given speed they will exert the same inertia as an automobile moving at a given rate of speed. Since the inertia of the flywheel is the product of the mass and speed, the flywheel may be made relatively light in weight and large in diameter. The employment of a flywheel for each rotor shaft permits the use of a drum of comparatively small diameter and this construction has been found to be more economical and desirable than the combination of drum and flywheel used in the embodiments of the invention disclosed in the patents referred to above.

Since the inertia of the various rotors will vary unless all are moving at the same rate of speed, it is necessary in order to make an accurate comparative test of the brakes of all the wheels that the speed of all the rotors be synchronized just prior to the commencement of the braking test and that at the commencement of the test the control be released so that each rotor may move independently. In order to accomplish this result clutches are provided between the alined ends of the shafts 23 and 24 and the shafts 25 and 26 and driving means provided connecting the front and rear pairs of shafts. Control means are provided by which the clutches may be initially engaged and by which they will be disconnected at the commencement of the test.

Keyed to each shaft adjacent its inner end is a male clutch member 30 having on its face the teeth 31. Supported between the aligned ends of the front and rear pairs of shafts are female clutch members 32 having on their faces depressions to receive the teeth 31 of the male members and to make positive engagement therewith. When the clutches are engaged each pair of shafts will rotate as a unit. Extending centrally around the female clutch members and integral therewith is a worm gear 33 and extending longitudinally of the apparatus beneath the clutch mechanism is a telescoping drive shaft 34 provided with a worm 10 at each end thereof (Fig. 3) said worms permanently engaging both worm gears 33 and thereby synchronizing the speed of all the shafts when the clutches are in gear. The male clutch members as stated before are keyed to the shaft and are free to move transversely sufficiently to engage the female members.

Figure 5:
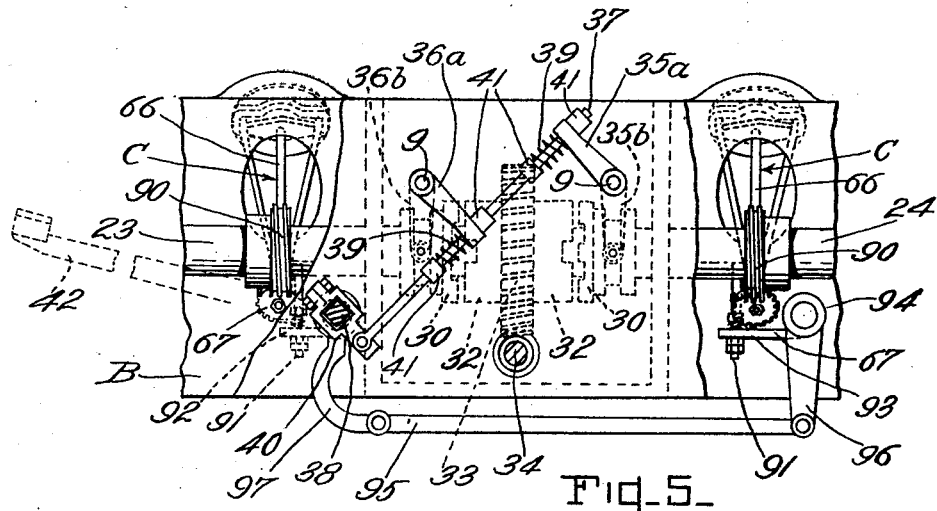
Fig. 5 is a vertical section taken substantially on the line 5—5, Fig. 3.

As shown in Fig. 5 each of the male clutch members 30 is connected, by means of the pairs of arms 35a and 35b and 36a and 36b with the rod 37. The arm 37 is angularly disposed with relation to the axes of the clutch members and is fixed at one end to a collar 40 slidably mounted on shaft 38 but rotatable therewith. The pairs of links 35a and 35b and 36a and 36b are joined together by the rocker shafts 9 and have a sort of bell crank movement.

Each of the arms 35a and 36a slidably engages the rod 37 between a pair of collars 41 and abuts against the coiled springs 39 interposed between the arm and one of the said collars. The springs 39 form yielding connections between the arms and rod and serve to prevent clashing of the clutch members thus enabling them to be engaged and disengaged smoothly. The movement of the rod 37 is controlled by the shaft 38 to which it is fixed by the collar 40. This shaft is in turn controlled by means of a treadle 42 (see Figs. 1, 2, 5 and 7) operatively connected thereto. When the treadle is depressed the shaft 38 will be partially rotated in a counter-clockwise direction causing the rod 37 to move upwardly thereby causing the arms 35 and 36 to draw the male clutch members 30 into engagement with the female clutch members 32. It will be readily seen that as the shaft 38 is given a partial rotation in either direction the rod 37 will be given an angular movement outwardly or inwardly causing the clutch members to be engaged or disengaged. This arrangement provides for a positive and simultaneous engagement of each pair of gears. Thus each pair of shafts will be connected, and since the female clutch members of both pairs of shafts are joined by the drive shaft 34, the worms 10, and the worm gears 33, all of the shafts will rotate at the same speed.

When the rotors have attained the desired speed the clutches are disengaged in order that each wheel may rotate independently during the braking test. The clutches are disengaged by means of an electric circuit controlling a solenoid 43 (Figs. 1 and 7) which serves to free the depressed treadle 42, thereby disengaging the male clutch members and at the same time connecting the counters C (to be described hereafter) to their respective rotor shafts to record the independent travel of each wheel during the braking operation. To commence the brake test the foot brake 50 of the car being tested is depressed. The free ends 53 of the two electric connections 51 and 52 are initially mounted in the body of the car adjacent the path of movement of the foot brake 50 so that the circuit will be closed when the foot brake is depressed. The circuit thus formed includes the battery 52 and the solenoid 43 controlling the treadle 42. Simultaneously with the closing of the circuit when the brake is applied, the solenoid 43 is actuated forcing down the core 55 (Fig. 7) and causing it to contact with the bell crank shaped trigger 56 which is pivoted at 57 and shaped at its end 58 to make a sliding connection with the center pivot of the toggle arms 59 and 60 by which it is connected to the latch 44. The toggle arms are connected to the frame and to the latch respectively, as illustrated. The latch 44 is pivoted to the frame at 63 and is provided with a recess 61 for the reception of the treadle 42 when in depressed position as shown in Figs. 1 and 7. When the treadle 42 is engaged by the latch 44 it is held in this position until the solenoid is actuated. When this occurs the core 55 strikes the trigger 56, rotating it about its pivot and permitting the toggle to move upwardly. The latch is then free to swing in its pivot permitting the treadle to be drawn upwardly into normal position as indicated in dotted lines in Fig. 5, by the spring 73 provided therefor. The upward movement of the treadle causes the treadle shaft 38 to rotate in a clockwise direction thus disengaging the clutch members 30 and 32 as described above and freeing the rotors, permitting an independent record to be made of the travel of each during the braking operation.

As stated above the counters engage the rotor shafts simultaneously with the disengagement of the clutch members in order to measure independently the travel of each wheel during the braking operation.

Figure 8:
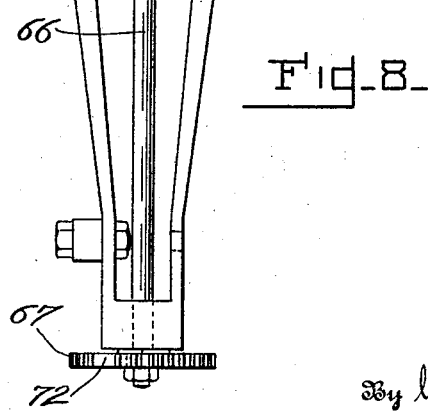
Fig. 8 is a detail view of one of the counters.
Figure 9:
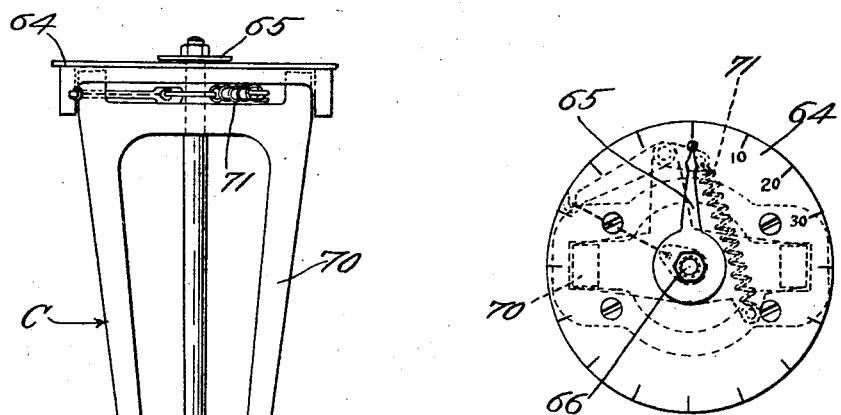
Fig. 9 is a plan view thereof showing the face of one of the counters and the manner in which it is calibrated.

The counters C, shown in Figs. 8 and 9, comprise a calibrated dial 64 having a rotatable pointer 65 pivoted thereon. The pointer is mounted on a shaft 66 which carries at its opposite end a worm gear 67 by the rotation of which the counters are actuated. The counters are trunnioned in the frame and are so located that each worm gear 67 is positioned adjacent a worm 90 fixed to each rotor shaft, but is normally disconnected therefrom.

Figure 3:
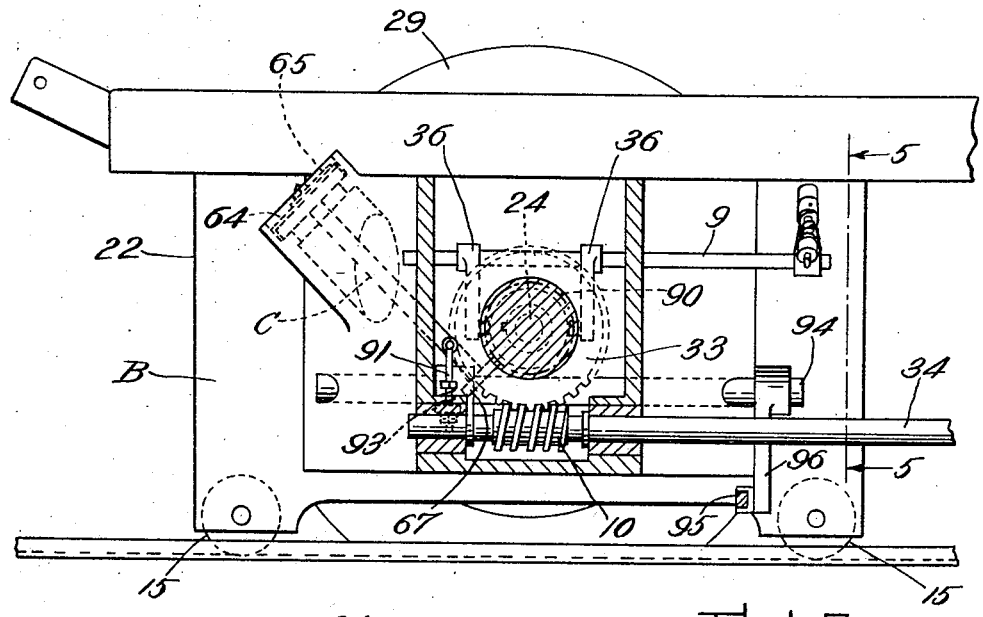
Fig. 3 is a vertical section taken on the line 3—3 of Fig. 2 and showing the parts in the position they occupy during the test.
Figure 4:
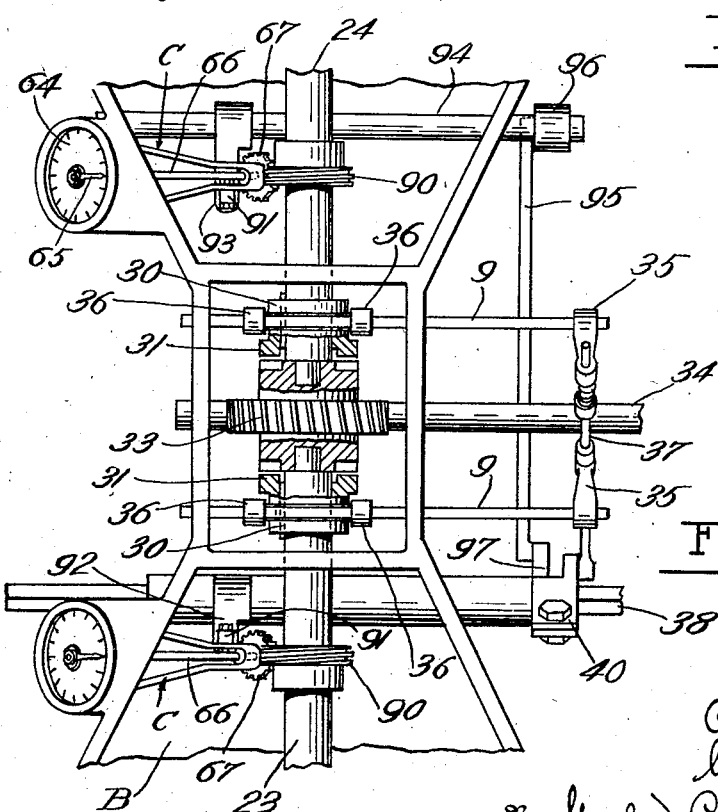
Fig. 4 is a plan view of the mechanism illustrated in Fig. 3.

Pivotally connected to the frames 70 of each pair of counters are depending links 91 which are yieldingly connected to arms 92 and 93 as shown in Figs. 3, 4 and 5. The arm 92 is directly connected to the treadle shaft 38 while the arm 93 is fixed to a rocker shaft 94 mounted in the frame. The rocker shaft 94 is connected with the treadle shaft 38 by a link 95 one end of which is pivotally connected to an arm 96 fixed to said rocker shaft while the other end is pivotally connected to an arm 97 depending from the collar 41 mounted on the treadle shaft. When the treadle shaft 38 is given a partial rotation in a clockwise direction the clutch members 30 and 32 will be disengaged as previously described, and the arms 92 and 93 will contact with the links 91 thereby moving the counters C and bringing the worm gears 67 of the counters into engagement with the worms 90 provided therefor on the rotor shafts thus actuating the pointer 65 and causing the distance travelled by each rotor to be independently recorded.

As previously stated each counter is shielded by a frame 70 and the pointer 64 is connected to the frame by a spring 71 which serves to return the pointer to zero after the braking operation. To prevent the pointer being moved too far and causing breakage of the parts the worm gear 67 is provided with a relieved portion 72 from which the gear teeth are eliminated. Ordinarily during a braking operation the worm gear will not be rotated far enough for this relieved portion to come into opposition with the worm 69. If however for some reason the pointer was not initially at zero, or the wheel travels an abnormal distance during the braking operation, the relieved portion will oppose the worm gear 67, thereby breaking the connection therebetween and preventing further rotation of the counter.

Figure 2:
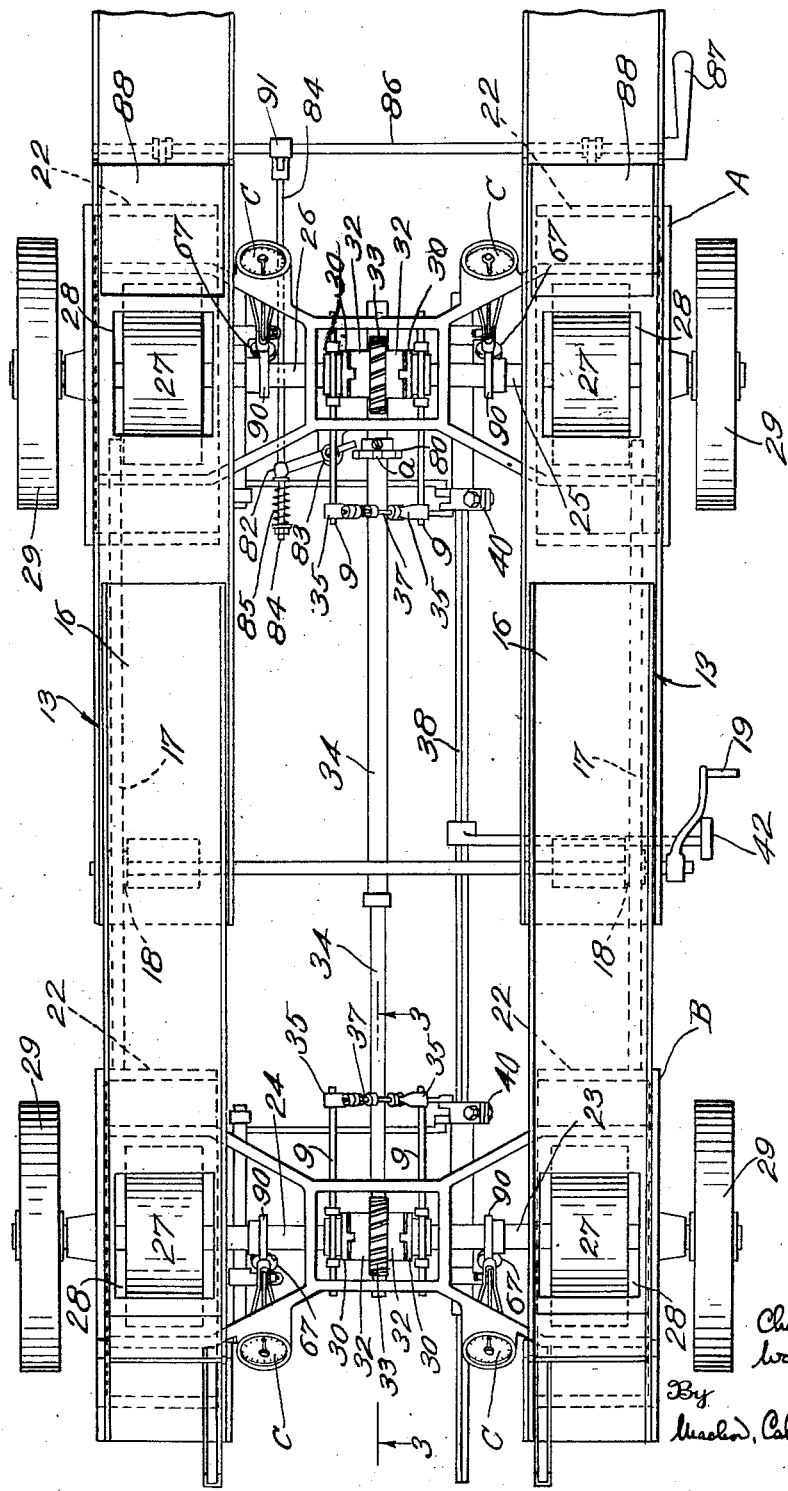
Fig. 2 is a plan view of the embodiment illustrated in Fig. 1.

When a car, the brakes of which are to be tested, is initially run onto the ways 13 it is very difficult to position the wheels of the car upon the drums of the rotors unless the rotors are immovably locked in place. For this purpose locking means, shown in Figs. 1 and 2, is provided. Positioned on the main driving shaft 34 in front of the rear rotor shafts is a fixed disk 80. This disk is provided at intervals with slots *a* to receive the end of the lock bar 82 which is pivoted at 83, the other end being loosely connected to the link 84 in abutting relation with a spring 85 mounted thereon. The link 84 is pivotally connected at its rearward end to an arm 91 fixed to a transverse shaft 86 which is controlled by the handle 87. When the handle 87 is elevated to the dotted line position shown in Fig. 1, the rotation of the shaft 86 draws back the link 84 causing the spring 85 to exert sufficient pressure on the head of the lock bar 82 to cause it to turn on its pivot and engage one of the slots *a* in the disk 80. The shaft 86 preferably extends the entire width of the machine and is connected at either end to the skids 88 (Figs. 1 and 2) provided in the ways 13. The skids 88 being also controlled by the shaft 86 act simultaneously with the locking means and assist the wheels of the car to mount the rotors. As shown in Figs. 1 and 2, the skids are in retracted position when the rotors are unlocked.

After the machine has been adjusted for the proper length of the wheel base and the car has been placed thereon, it is desirable to secure the car in position so that the rotors may be unlocked and the blocks removed from the wheels of the car preparatory to the test. For this purpose chains 89 securing the axles of the wheels to the frame 12 may be provided.

Many modifications of this invention are possible without departing from the spirit and scope thereof, for example, it has been found desirable under some circumstances to eliminate the battery shown in the drawings in connection with the electric circuit and to supply power by direct connection with a lighting circuit.

Another modification of the invention is to provide mechanical means connecting the vehicle brake with the rotor disconnecting means, thereby doing away with the solenoid mechanism.

Many other modifications would suggest themselves to those skilled in the art and it is understood that this invention is to be limited only by the following claims.

We claim:

1. In a brake testing machine, the combination of a plurality of rotors adapted to store kinetic energy and arranged respectively for operative connection with separate wheels of a vehicle whose brakes are to be tested, means including a releasable positive connecting device for each rotor for connecting all of said rotors for rotation in unison, and means for simultaneously releasing all of said connecting means.

2. In a brake testing machine, the combination of a plurality of pairs of opposed rotors adapted to store kinetic energy and arranged respectively for operative connection with corresponding opposed pairs of wheels of a vehicle whose brakes are to be tested, a rotatable member intermediate the rotors of each pair, permanently engaged power transmitting means for connecting said members for rotation in unison, separate releasable devices connecting the respective rotors of each pair with their intermediate rotatable member and means for simultaneously releasing all of said connecting devices.

3. A brake testing apparatus having ways to receive a vehicle, rotors positioned in said ways and adapted to support and to be driven by the wheels of the vehicle, releasable means for locking said rotors while said vehicle is being positioned thereon and inclined skids positioned in said ways, said skids being operatively connected to said locking means and movable therewith.

4. A brake testing apparatus having a plurality of rotors adapted to store kinetic energy and arranged respectively for operative connection with the separate wheels of a vehicle the brakes of which are to be tested, separate clutch means connecting front and rear pairs of rotors respectively, a power transmitting shaft joining said clutch means for rotation in unison, a slotted disk mounted on said shaft, a lock bar having an end engageable with said slots pivotally mounted adjacent said disk, and means for moving said bar into and out of engagement with said disk to lock and unlock said rotors.

5. In a brake testing machine the combination with a plurality of rotors adapted to store kinetic energy and arranged respectively for operative connection with the separate wheels of a vehicle whose brakes are to be tested, of power transmitting mechanism for connecting said rotors for rotation in unison and means arranged to be operated by the braking means of the vehicle for disconnecting said rotors and permitting them to rotate independently of one another.

6. In a brake testing machine the combination with a plurality of rotors adapted to store kinetic energy and arranged respectively for operative connection with the separate wheels of a vehicle whose brakes are to be tested, of power transmitting mechanism for connecting said rotors for rotation in unison, means for disconnecting said rotors and permitting them to rotate independently of one another and means for operatively connecting said last named means with the braking means of the vehicle for operation thereby.

7. In a brake testing machine, the combination with a plurality of rotors adapted to store kinetic energy and arranged respectively for operative connection with the separate wheels of a vehicle whose brakes are to be tested, of means for connecting said rotors to revolve in unison, electrically actuated means for disconnecting said connecting means and an electric circuit operatively connected with said disconnecting means and with the braking means of the vehicle and adapted to be closed upon the application of said braking means.

8. In a brake testing machine, the combination of a plurality of rotors adapted to store kinetic energy and arranged respectively for operative connection with the separate wheels of a vehicle whose brakes are to be tested, power transmitting mechanism for said rotors, a clutch member for engaging each rotor with said power transmitting mechanism, a rotatable control shaft, and means fixed to said control shaft and rotatable therewith for engaging or disengaging said clutch members and said power transmitting mechanism according to the direction of rotation of said control shaft.

9. In a brake testing machine the combination with a plurality of rotors adapted to store kinetic energy and arranged respectively for operative connection with the separate wheels of a vehicle whose brakes are to be tested, of power transmitting mechanism for driving said rotors in unison, separate devices for engaging the several rotors with said power transmitting mechanism, a control shaft, means connecting said shaft and said engaging means and adapted to engage or disengage said devices with said power transmitting mechanism according to the direction in which said shaft is rotated, means for rotating said shaft in one direction to cause the engagement of said devices and means actuated by closing an electric circuit for rotating said shaft in the other direction to disengage the devices.

10. A brake testing device comprising rotors one for each wheel of a vehicle whose brake is to be tested, each of said rotors being arranged for operative connection with one of the wheels of the vehicle and being capable of storing kinetic energy, positive releasable means connecting the rotors to each other, means arranged to be operated by the braking means of the vehicle for disconnecting said positive connecting means upon the application of the brakes, and means for indicating the travel of each wheel after the application of the brakes.

11. A brake testing device comprising rotors, one for each separate wheel of a vehicle whose brakes are to be tested, each of said rotors being in engagement with one of the wheels of the vehicle and being capable of storing kinetic energy, permanently engaged power transmitting mechanism for connecting said rotors for rotation in unison, separate devices connecting the several rotors respectively with said power transmitting mechanism and means arranged to be operated by the braking means of the vehicle for simultaneously releasing all of said connecting devices, travel indicating devices engageable with the said rotors, and means operated by said braking means for engaging said indicating devices.

12. In a brake testing machine, the combination of a plurality of rotors adapted to store kinetic energy and arranged respectively for operative connection with the separate wheels of a vehicle whose brakes are to be tested, of power transmitting mechanism for connecting said rotors for rotation in unison, means for indicating the extent of movement of each rotor and means for disconnecting said rotors and permitting them to run independently of one another and for simultaneously operatively connecting the several indicating means with their respective rotors.

13. In a brake testing machine the combination with a plurality of rotors adapted to store kinetic energy and arranged respectively for operative connection with the separate wheels of a vehicle whose brakes are to be tested, of power transmitting mechanism for connecting said rotors, separate connecting devices for the several rotors engageable with said power transmitting mechanism, individual devices engageable with each of said rotors for indicating the extent of movement of each rotor, a rotatable control shaft, and means fixed to said shaft and rotatable therewith for engaging or disengaging said indicating devices with said rotors according to the direction of rotation of said shaft.

14. In a brake testing machine the combination with a plurality of rotors adapted to store kinetic energy and arranged respectively for operative connection with the separate wheels of a vehicle whose brakes are to be tested, of power transmitting mechanism for connecting said rotors, separate means for the several rotors for engaging said rotors with said power transmitting mechanism, individual devices engageable with each of said rotors for indicating the extent of movement of each rotor, a rotatable control shaft, means joining said rotor engaging means to said shaft and adapted to engage or disengage said means according to the direction of rotation of said shaft, and means joining said indicating devices to said shaft and adapted to engage said devices when said shaft is rotated in a direction to disengage said rotor engaging means and to disengage said devices when said shaft is rotated in a direction to engage said rotor engaging means.

15. In a brake testing machine, in combination, rotors adapted to store kinetic energy and arranged respectively for operative connection each with a corresponding wheel of the vehicle whose brakes are to be tested, means including a releasable positive connecting device for each rotor for connecting all of said rotors for rotation in unison, means for indicating the extent of movement of each rotor and means for simultaneously releasing all of said connecting devices and operatively connecting the several indicating means with their respective rotors.

16. In a brake testing machine, in combination, rotors adapted to store kinetic energy and arranged respectively for operative connection with the separate wheels of a vehicle whose brakes are to be tested, power transmitting mechanism for connecting said rotors for rotation in unison, means for independently connecting the several rotors respectively with said power transmitting mechanism, means for indicating the extent of travel of each rotor, and means for simultaneously releasing all of said connecting devices and operatively connecting the several indicating means with their respective rotors.

17. A brake testing device comprising rotors, one for each wheel of a vehicle whose brake is to be tested, each of said rotors being in engagement with one of the wheels of the vehicle and being capable of storing kinetic energy, power transmitting mechanism for connecting said rotors for rotation in unison, means for indicating the extent of movement of each rotor, and means arranged to be operated by the braking means of the vehicle for disconnecting said rotors and permitting them to run independently of one another and for simultaneously connecting the several indicating means with their respective rotors.

18. In a brake testing machine the combination with a plurality of rotors adapted to store kinetic energy and arranged respectively for operative connection with separate wheels of a vehicle whose brakes are to be tested, of devices for indicating the extent of movement of each rotor, means carried by each rotor for engaging said devices, a rotatable control shaft, and means joining said devices to said shaft and rotatable therewith whereby said indicating devices may be moved into and out of engagement with said rotors according to the direction of rotation of said shaft.

In testimony whereof we affix our signatures.

CHARLES F. SMITH.
WALTER F. PAGE.